US011156249B2

(12) United States Patent
Naber

(10) Patent No.: US 11,156,249 B2
(45) Date of Patent: Oct. 26, 2021

(54) HYBRID OPPOSED-PISTON INTERNAL COMBUSTION ENGINE

(71) Applicant: Pinnacle Engines, Inc., San Carlos, CA (US)

(72) Inventor: Clayton Naber, San Mateo, CA (US)

(73) Assignee: Pinnacle Engines Inc., San Carlos, CA (US)

( * ) Notice: Subject to any disclaimer, the term of this patent is extended or adjusted under 35 U.S.C. 154(b) by 111 days.

(21) Appl. No.: 16/670,176

(22) Filed: Oct. 31, 2019

(65) Prior Publication Data

US 2020/0132110 A1 Apr. 30, 2020

Related U.S. Application Data

(60) Provisional application No. 62/753,814, filed on Oct. 31, 2018.

(51) Int. Cl.
*F01B 7/14* (2006.01)
*F16C 3/06* (2006.01)
*F02B 75/28* (2006.01)
*F16J 1/10* (2006.01)

(52) U.S. Cl.
CPC .................. *F16C 3/06* (2013.01); *F01B 7/14* (2013.01); *F02B 75/28* (2013.01); *F16J 1/10* (2013.01); *F16C 2380/26* (2013.01)

(58) Field of Classification Search
CPC .......... F16C 3/06; F16C 2380/26; F01B 7/14; F01B 7/02; F01B 11/00; F02B 75/28; F02B 75/32; F16J 1/10
See application file for complete search history.

(56) References Cited

U.S. PATENT DOCUMENTS

| 2009/0090334 A1* | 4/2009 | Hyde | F02B 75/048 |
| | | | 123/51 R |
| 2021/0054781 A1* | 2/2021 | Nishida | F02B 75/28 |

FOREIGN PATENT DOCUMENTS

DE      10 2008 058 119 A1    5/2009

\* cited by examiner

*Primary Examiner* — Jacob M Amick
(74) *Attorney, Agent, or Firm* — Platinum Intellectual Property LLP

(57) ABSTRACT

A hybrid opposed piston engine is described that can include a cylindrical chamber and first and second pistons slidably disposed in the cylindrical chamber, surfaces of the first and second pistons and walls of the cylindrical chamber defining an internal combustion volume. The hybrid opposed piston engine can also include at least one port in the cylindrical chamber to allow air and fuel into and exhaust gas out of the internal combustion volume. In some embodiments, the hybrid opposed piston engine includes a drive shaft including a first mechanical linkage between the first piston and a crankshaft that is configured to move the first piston within the cylindrical chamber. In some embodiments, the hybrid opposed piston engine includes an electrical component adjacent to the second piston, the electrical component configured to move the second piston within the cylindrical chamber.

18 Claims, 3 Drawing Sheets

HYBRID OPPOSED-PISTON INTERNAL COMBUSTION ENGINE

CROSS-REFERENCE TO RELATED APPLICATION

The current application claims priority under 35 U.S.C. § 119(e) to U.S. Provisional patent application Ser. No. 62/753,814, filed on Oct. 31, 2018 and entitled "Hybrid Opposed-Piston Internal Combustion Engine," which is incorporated by reference herein in its entirety.

TECHNICAL FIELD

The subject matter described herein relates to various embodiments of a hybrid opposed-piston internal combustion engine.

BACKGROUND

An internal combustion engine can include a fixed cylinder and at least one moving piston. In such a configuration, expanding combustion gases in the cylinder can push the piston, which in turn rotates the crankshaft. Internal combustion engines can include multiple cylinders that turn a single crankshaft. Each cylinder can fire at a different time so, at any given moment, there can be at least one cylinder adding power and advancing the vehicle. The cylinders can be attached to the crankshaft by rods that connect to the piston rods inside the cylinders.

In some opposed-piston engines, two pistons come together within a cylinder and the piston crowns define the combustion chamber. The most common and widely deployed opposed-piston engine can include two crankshafts with one crankshaft coupled to each of the opposed pistons. One of the design challenges associated with an opposed-piston engine is the crank-to-crank mechanical linkage, such as due to friction, causing increased parasitic drag loss that can reduce thermodynamic efficiency and generate unwanted noise.

For example, an engine can lose up to 75% of its generated energy in the form of friction, heat transfer to the environment, and enthalpy lost to the exhaust gas stream. A major source of engine friction and wear can include forces exerted on the piston by the combustion gases and subsequently reacted through the connecting rod by the crankshaft. Furthermore, while high compression engines are generally more efficient, greater compression increases the forces exerted on the piston, increasing the likelihood of unwanted pre-ignition of fuel (commonly referred to as knock), and resulting in higher combustion gas temperatures which are responsible for the formation of NOx (oxides of nitrogen) emissions.

A variable compression ratio engine can provide various advantages, such as preventing pre-ignition, such as by dropping the compression ratio during periods of high torque production to keep knock from happening, while increasing the ratio during periods of lower torque output, for greater efficiency (e.g., reduced exhaust loss due to a higher expansion ratio). This can provide additional power when needed, and better economy when not needed, but its efficacy is limited by NOx production that results when the compression ratio is increased. To avoid NOx production, the combustion event may be delayed as a countermeasure. However, doing so can reduce the realizable expansion ratio improvement of higher compression ratios. Typical approaches to variable-compression can use multiple-link piston rods where the piston rod has a central pivoting multi-link that can change angle, which in turn can change the effective length of the piston rod, thereby changing the amount the piston moves in the cylinder. The amount the piston moves in the cylinder can change the compression ratio. However, inclusion of additional mechanical linkage can result in the same mechanical restraints as mentioned above, such as causing additional frictional losses thus reducing thermodynamic efficiency.

SUMMARY

Aspects of the current subject matter include various embodiments of a hybrid opposed-piston internal combustion engine. In some variations, a hybrid opposed piston engine may include a cylindrical chamber. The hybrid opposed piston engine may include first and second pistons slidably disposed in the cylindrical chamber. Surfaces of the first and second pistons and walls of the cylindrical chamber may define an internal combustion volume. The hybrid opposed piston engine may include at least one port in the cylindrical chamber to allow air and fuel into and exhaust gas out of the internal combustion volume. The hybrid opposed piston engine may include a drive shaft including a first mechanical linkage between the first piston and a crankshaft that may be configured to move the first piston within the cylindrical chamber. The hybrid opposed piston engine may include an electrical component adjacent to the second piston. The electrical component may be configured to move the second piston within the cylindrical chamber.

In some variations one or more of the following features can optionally be included in any feasible combination. The electrical component may include one or more of an induction motor and a piezoelectric motor. The electrical component may include an electrical coil that extends around a circumference of the cylindrical chamber. The second piston may be made out of one or more of an iron and a steel material. A position of the second piston along the cylindrical chamber may be based on an amount of electrical current moving along a part of the electrical coil. An acceleration of the second piston along the cylindrical chamber may be based on an amount of electrical current moving along a part of the electrical coil. An amount of force the second piston applies in a direction of the internal combustion volume may be based on an amount of electrical current moving along a part of the electrical coil. The electrical component may be coupled to the second piston via a second mechanical linkage. The electrical component may be configured to move the second mechanical linkage to move the second piston within the cylindrical chamber. The electrical component may include a rotational electrical component coupled to the crankshaft of the second mechanical linkage. The electrical component may include a servo motor.

In another interrelated aspect of the current subject matter, a method includes moving a crankshaft of a hybrid opposed piston engine. The hybrid opposed piston engine may include a cylindrical chamber. The hybrid opposed piston engine may include first and second pistons slidably disposed in the cylindrical chamber. Surfaces of the first and second pistons and walls of the cylindrical chamber may define an internal combustion volume. The hybrid opposed piston engine may include at least one port in the cylindrical chamber to allow air and fuel into and exhaust gas out of the internal combustion volume. The hybrid opposed piston engine may include a drive shaft including a first mechanical linkage between the first piston and the crankshaft, wherein movement of the crankshaft may cause movement of the first piston within the cylindrical chamber. The hybrid opposed piston engine may include an electrical component adjacent to the second piston. The electrical component may be configured to move the second piston within the cylindrical chamber. The method of a hybrid opposed piston engine may further include moving, as a result of a first current traveling along a part of the electrical component, the second piston within the cylindrical chamber.

The method of the hybrid opposed piston engine may include adjusting the first current to cause a change in an acceleration of the second piston. The method of the hybrid opposed piston engine may include adjusting the first current to cause a change in an applied force by of the second piston in a direction of the internal combustion volume. The method of the hybrid opposed piston engine may include adjusting the first current to cause a change in a position of the second piston along the cylindrical chamber.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
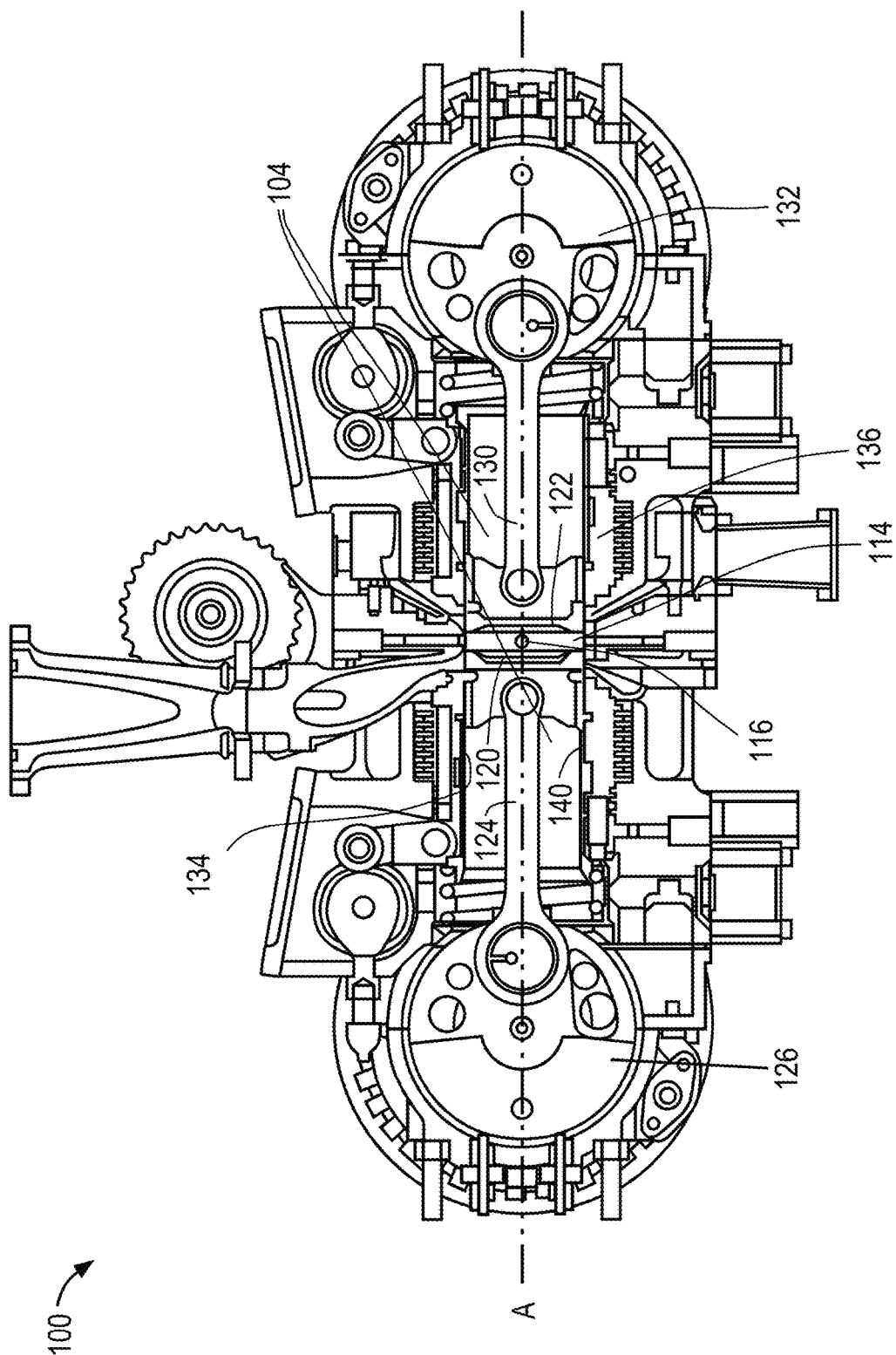
FIG. 1 illustrates an example opposed piston engine consistent with implementations of the current subject matter.

Various embodiments of a hybrid opposed piston engine are described herein that include a mechanical crankshaft assembly configured to control a first piston and an electrical component configured to control a second piston and generate electrical power. As such, at least one piston in the hybrid opposed piston engine is not mechanically controlled and, instead, is electromechanically controlled. In some implementations, the hybrid opposed piston engine is configured to dynamically change an internal combustion compression and/or expansion ratio, such as by varying the activation of the electrical component to thereby adjust a position of the second piston relative to the first piston.

The electrical component can include a motor and/or generator, such as an induction motor, a piezoelectric motor, and/or the like. The electromagnetically driven piston may be configured for electrical power generation as part of a hybrid electric/internal combustion engine system. Elimination of one or more connecting rod and crankshaft assemblies and/or crank-to-crank connection from the opposed-piston cylinder assembly can facilitate control of the thermodynamic cycle (e.g., cylinder combustion volume with respect to time).

The electrical component can eliminate frictional losses, thus increasing the net thermodynamic efficiency of the system. The hybrid opposed piston engine may achieve thermodynamic efficiency by facilitating otherwise unattainable working cycles in the internal combustion engine and eliminating sources of friction. Furthermore, by eliminating one or more of the crankshaft and connecting rod sets from the engine, the size of the engine can be reduced.

Further, the hybrid opposed piston engine may achieve improved thermodynamic efficiency by dynamically manipulating the combustion volume in the cylinder through instantaneous electronic control of the secondary piston position. By adding combustion volume as an additional degree of freedom with which to manage combustion temperature, NOx emissions can be reduced and thermodynamic efficiency can be improved.

For example, thermodynamic efficiency may be increased at low engine power output levels through continuously variable piston displacement. The travel of the electromagnetically driven piston can be controlled electronically, allowing the piston displacement to be adjusted to an optimal setting for a given engine power output level without changing the compression ratio. Instead of reducing inlet manifold pressure by throttling air flow, which increases pumping work (a thermodynamic efficiency loss), implementations of the hybrid opposed piston engine may reduce cylinder capacity thus reducing engine power output, thereby reducing pumping loss and increasing efficiency.

By continuously varying each cylinder's capacity, rather than preventing entire cylinders from firing, variable displacement may be smoother and more efficient, such as compared to some conventional cylinder deactivation strategies that switch on and off entire cylinders of a multi-cylinder engine. Furthermore, implementations of the current subject matter may be applicable to single-cylinder or low cylinder count engines (e.g., two and/or three cylinders) where deactivation is unacceptable. In a deactivation system, many of the deactivated cylinder components (e.g., crank, connecting rod, piston assemblies) may still be in motion and therefore contributing to friction despite producing no useful power. In contrast, the continuously variable strategy may improve net efficiency while operating in low power mode.

In some embodiments, inlet stroke volume may be controlled directly via electronic control of a secondary crank position during an induction stroke. Controlling power output in this manner can minimize pumping work done during the induction stroke, which can be lost energy in the thermodynamic cycle, thereby improving thermodynamic efficiency.

In some embodiments, the hybrid opposed piston engine may include a mechanical transmission and/or driveline connection to a first piston and/or an electrical component connection to a second piston. Such embodiments may be configured to generate electrical power and/or control thermodynamic cycles (e.g., combustion volume with respect to time), by eliminating one or more crank-to-crank connections in the hybrid opposed piston engine. Alternatively, such effects may also be achieved via an electrical component connection to a first piston and/or the electrical component connection to the second piston.

Further, the electrical component may be optionally coupled to the drivetrain of the vehicle to add propulsion power. Implementations of the hybrid opposed piston engine as described herein can achieve improved thermodynamic efficiency by achieving improved working cycles and at least limiting sources of friction.

FIG. 1 illustrates an opposed piston engine 100 that includes two pistons that share a common cylinder and form a combustion volume defined by the pistons and the walls of the cylinder. Other engine configurations, such as for example those in which each piston is disposed in a separate cylinder whose combustion volume is formed by the piston, a cylinder head, and the walls of the cylinder, are also within the scope of the current subject matter.

As shown in FIG. 1, the opposed piston engine 100 is configured such that a left piston 120 and a right piston 122 reciprocate within a cylindrical chamber or cylinder 104 along a centerline A of the cylindrical chamber or cylinder 104. The left piston 120 is connected to a left connecting rod 124, which in turn connects to a left crankshaft 126. The right piston 122 is connected to a right connecting rod 130, which in turn connects to a right crankshaft 132. The left piston 120 reciprocates within the cylinder 104, and is slidably movable to the left and right along the cylinder wall 134. The right piston 122 also reciprocates within the cylinder 104, and is slidably movable to the left and right along the cylinder wall 134.

FIG. 1 also illustrates a sleeve valve body 140 that can be slidably movable to the left and right (from the FIG. 1 perspective), such as relative to an oil-path defining piece 136. The left piston 120 and right piston 122 are disposed in the cylinder 104 as they would be at Top Dead Center (TDC), with the combustion volume, which is defined by the cylinder wall 134, the valve seat 114, and the piston heads of the left piston 120 and right piston 122, at its smallest. An engine can be configured such that the ignition timing occurs either at, before, or after the minimum combustion volume.

Figure 2:
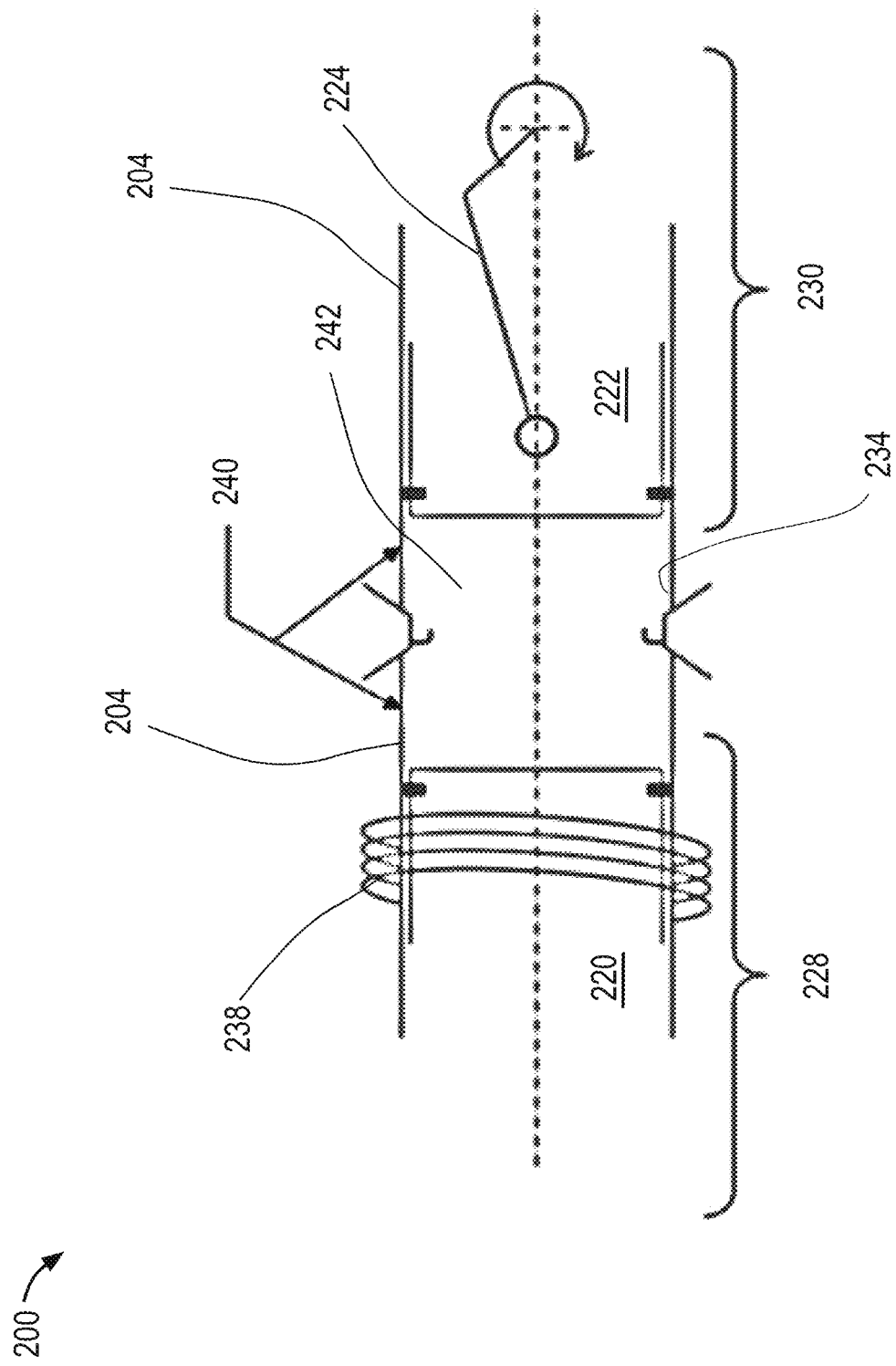
FIG. 2 illustrates an embodiment of a hybrid opposed piston engine consistent with implementations of the current subject matter.

FIG. 2 illustrates an embodiment of a hybrid opposed piston engine 200. As shown in FIG. 2, the hybrid opposed piston engine 200 includes a cylinder 204 that houses a first piston 222 opposed to a second piston 220. The first piston 222 and second piston 220 are centered along a linear axis such that a crown of the first piston 222 is facing a crown of the second piston 220. A combustion volume 242 is formed within the cylinder 204 (e.g., defined by inner walls 234 of the cylinder 204) and between the piston crowns of the first piston 222 and second piston 220. One or more sleeve valves 240 coupled with the cylinder 204 may be disposed proximate to the combustion volume 242. The first piston 222 and second piston 220 may be configured for reciprocating motion along a linear axis and within the cylinder 204.

As shown in FIG. 2, the first piston 222 can be coupled to a crankshaft assembly 230, which can include a connecting rod 224 extending between a crankshaft and the first piston 222. Additionally, the second piston 220 can be coupled to and/or controlled by a linear electrical component 228. The linear electrical component 228 can be configured to generate an electric current through an electrical coil 238 that can be circumferentially disposed around the outside of the cylinder 204, such as around a part of the cylinder 204 that is adjacent to and/or around a circumference of the second piston 220, as shown in FIG. 2. The position of the second piston 220, which may be formed from one or more ferrous materials such as iron or steel, may be controlled by an amount of current that is run through the linear electrical component 228, such as an amount of current that is run through the electrical coil 238.

For example, in some implementations of the hybrid opposed piston engine 200 an amount of current moving through the electrical coil 238 (e.g., a pulsewidth modulated control for the average current) can determine one or more of an acceleration of the second piston 220 (e.g., toward and/or away from the first piston 222), how much force the second piston 220 applies in the direction of the combustion volume 242, and how much force is applied to the second piston 220. Electronic variation of the current by the linear electrical component 228 can control the amount of force applied to the second piston 220. For example, greater current may induce faster movement of the second piston 220 within the cylinder. In some implementations, a position of the second piston 220 can be determined based on a force applied by the second piston 220 and a pressure in the combustion chamber. The linear electrical component 228 can assist with controlling the position of the second piston 220, including varying the position of the second piston 220 to thereby vary the combustion volume.

Various sensors and controls can be included in the hybrid opposed piston engine for determining an appropriate position of the second piston 220, which thereby controls the combustion volume. For example, volume scheduling/manipulation may be used to control the combustion process and tailor the temperature of combustion to avoid NOx emissions, to avoid knock, and achieve a high efficiency thermodynamic cycle. Additionally, by employing an electromagnetic device such as the linear electrical component 228 to move the second piston 220, the position of the second piston 220 may no longer be constrained to what a mechanical mechanism can provide. For example, the position of the second piston 220 in any given point in time can be determined and controlled electronically with software programming, which can result in maximized efficiency and/or minimized emissions.

Another implementation of the hybrid opposed piston engine can include an electric secondary crank. The electric secondary crank of the hybrid opposed piston engine may include both mechanical and electrical components. For example, in some implementations a rotational electrical component connected to the secondary crankshaft(s) may be configured to replace at least one mechanical link between the primary and secondary crankshafts. Such configurations can provide improved thermodynamic cycles and combustion modes, such as compared to conventional, mechanically coupled crankshaft engine designs. Implementations of the hybrid opposed piston engine as described in further detail below may add instantaneous, electronic control of combustion volume to accomplish alternate combustion cycles.

Figure 3:
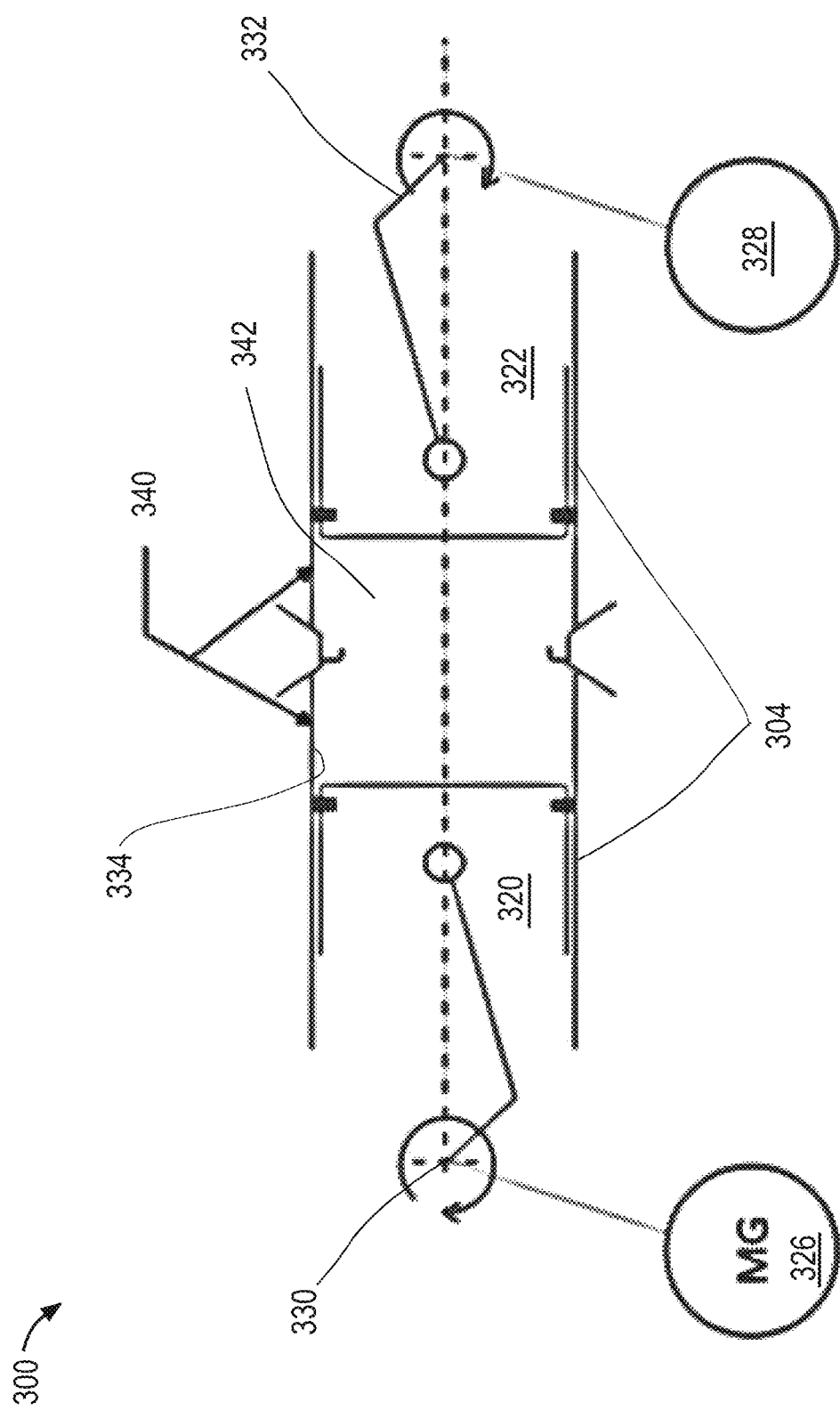
FIG. 3 illustrates another embodiment of a hybrid opposed piston engine consistent with implementations of the current subject matter.

FIG. 3 illustrates another embodiment of a hybrid opposed piston engine 300. As shown in FIG. 3, a cylinder 304 can house a first piston 322 opposed to a second piston 320 centered along a linear axis of the cylinder 304 such that each piston crown is facing toward the other. A combustion chamber 342 may be formed within the cylinder 304 (e.g., defined by the inner wall 334 of the cylinder 304) and between the two piston crowns. One or more sleeve valves 340 coupled with the cylinder 304 may be disposed proximate to the combustion chamber 342. The first piston 322 and the second piston 320 may be configured for reciprocating motion along the inner wall 334 of the cylinder 304.

As shown in FIG. 3, the first piston 322 of the hybrid opposed piston engine 300 can be coupled to a mechanical connecting rod/crankshaft assembly 332, which can be coupled to a transmission/driveline connection and configured to cause the first piston 322 to reciprocate in the cylinder 304. Reciprocating motion of the first piston 322 may be facilitated by the transmission/driveline connection and/or an additional motor/generator assembly. For example, the reciprocating motion of the first piston 322 may be facilitated by a second electrical component 328. In some embodiments, the second electrical component 328 can be configured to convert mechanical power (e.g., from the mechanical connecting rod/crankshaft assembly 332) to electrical power.

As shown in FIG. 3, the second piston 320 of the hybrid opposed piston engine can be coupled to a mechanical connecting rod/crankshaft assembly 330 that includes a first electrical component 326. The mechanical connecting rod/crankshaft assembly 330 can cause the second piston 320 to reciprocate in the cylinder 304. The first electrical component 326 can be configured to replace a traditional crankshaft and mechanical connection to the first crankshaft.

For example, an instantaneous position of the mechanical connecting rod/crankshaft assembly 330 can be controlled via pulsewidth modulation of a current supplied to the first electrical component 326. For example, one implementation of the first electrical component 326 may include a servo motor and at least one electrical control component. In some implementations, the electrical control component can be configured to measure a position of the servo motor and control a current to the servo motor for assisting with controlling a position of the servo motor (thereby controlling a position of the associated second piston 320).

The hybrid opposed piston engine 200 (as shown in FIG. 2) may require a full-stroke limiting mechanism for moving at least one piston. However, the hybrid opposed piston engine 300 (as shown in FIG. 3) may not require a full-stroke limiting mechanism for moving at least one piston, such as due to the electrical controls associated with the mechanical components. Other embodiments of the hybrid opposed piston engine are within the scope of this disclosure, such as an electrical component providing rotational and/or linear force along the mechanical components controlling one or both pistons in an opposed piston engine.

Terminology

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the teachings herein. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A hybrid opposed piston engine, comprising:
    a cylindrical chamber;
    first and second pistons slidably disposed in the cylindrical chamber, surfaces of the first and second pistons and walls of the cylindrical chamber defining an internal combustion volume;
    at least one port in the cylindrical chamber to allow air and fuel into and exhaust gas out of the internal combustion volume;
    a first drive shaft including a first mechanical linkage between the first piston and a first crankshaft that is configured to move the first piston within the cylindrical chamber;
    a first electrical component being coupled to the first drive shaft, the first electrical component configured to convert mechanical movement of the second piston to electrical power;
    a second drive shaft including a second mechanical linkage between the second piston and a second crankshaft is configured to move the first piston within the cylindrical chamber; and
    a second electrical component being coupled to the second piston via the second drive shaft, the second electrical component configured to move the first piston via the second drive shaft within the cylindrical chamber.

2. The hybrid opposed piston engine of claim 1, wherein the first and second electrical components includes one or more of an induction motor and a piezoelectric motor.

3. The hybrid opposed piston engine of claim 1, wherein the first piston and second piston are made out of one or more of an iron and a steel material.

4. The hybrid opposed piston engine of claim 1, wherein a position of the first piston along the cylindrical chamber is based on an amount of electrical current moving along a part of the second electrical component.

5. The hybrid opposed piston engine of claim 1, wherein an acceleration of the first piston along the cylindrical chamber is based on an amount of electrical current moving along a part of the second electrical component.

6. The hybrid opposed piston engine of claim 1 wherein an amount of force the first piston applies in a direction of the internal combustion volume is based on an amount of electrical current moving along a part of the second electrical component.

7. The hybrid opposed piston engine of claim 1, wherein the second electrical component is coupled to the first piston via the second mechanical linkage, the second electrical component being configured to move the second mechanical linkage to move the second piston within the cylindrical chamber.

8. The hybrid opposed piston engine of claim 7, wherein the second electrical component includes a rotational electrical component coupled to the second crankshaft of the second mechanical linkage.

9. The hybrid opposed piston engine of claim 7, wherein the second electrical component includes a servo motor.

10. A method of a hybrid opposed piston engine, comprising:
    moving a crankshaft of a hybrid opposed piston engine, the hybrid opposed piston engine, comprising:
    a cylindrical chamber;
    first and second pistons slidably disposed in the cylindrical chamber, surfaces of the first and second pistons and walls of the cylindrical chamber defining an internal combustion volume;
    at least one port in the cylindrical chamber to allow air and fuel into and exhaust gas out of the internal combustion volume;
    a first drive shaft including a first mechanical linkage between the first piston and the crankshaft, wherein movement of the crankshaft causes movement of the first piston within the cylindrical chamber;

a first electrical component being coupled to the first drive shaft, the first electrical component configured to convert mechanical movement of the second piston to electrical power;

a second drive shaft including a second mechanical linkage between the second piston and a second crankshaft is configured to move the first piston within the cylindrical chamber; and a second electrical component being coupled to the second piston via the second drive shaft, the second electrical component configured to move the first piston via the second drive shaft within the cylindrical chamber; and moving, as a result of a first current traveling along a part of the second electrical component, the first piston within the cylindrical chamber.

11. The method of claim 10, further comprising:
adjusting the first current to cause a change in an acceleration of the first piston.

12. The method of claim 10, further comprising:
adjusting the first current to cause a change in an applied force by of the first piston in a direction of the internal combustion volume.

13. The method of claim 10, further comprising:
adjusting the first current to cause a change in a position of the first piston along the cylindrical chamber.

14. The method of claim 10, wherein the first and second electrical components includes one or more of an induction motor and a piezoelectric motor.

15. The method of claim 10, wherein the first piston and second piston are made out of one or more of an iron and a steel material.

16. The method of claim 10, wherein the second electrical component is coupled to the first piston via the second mechanical linkage, the second electrical component being configured to move the second mechanical linkage to move the first piston within the cylindrical chamber.

17. The method of claim 16, wherein the second electrical component includes a rotational electrical component coupled to the second crankshaft of the second mechanical linkage.

18. The method of claim 17, wherein the second electrical component includes a servo motor.

* * * * *